(12) United States Patent
Zanchettin et al.

(10) Patent No.: US 11,110,605 B2
(45) Date of Patent: Sep. 7, 2021

(54) METHOD AND DEVICE FOR CONTROLLING THE MOTION OF ONE OR MORE COLLABORATIVE ROBOTS

(71) Applicant: POLITECNICO DI MILANO, Milan (IT)

(72) Inventors: Andrea Maria Zanchettin, Milan (IT); Paolo Rocco, Milan (IT)

(73) Assignee: Politecnico Di Milano, Milan (IT)

( * ) Notice: Subject to any disclaimer, the term of this patent is extended or adjusted under 35 U.S.C. 154(b) by 252 days.

(21) Appl. No.: 16/099,387

(22) PCT Filed: May 18, 2017

(86) PCT No.: PCT/IB2017/052932
§ 371 (c)(1),
(2) Date: Nov. 6, 2018

(87) PCT Pub. No.: WO2017/199196
PCT Pub. Date: Nov. 23, 2017

(65) Prior Publication Data
US 2019/0210224 A1    Jul. 11, 2019

(30) Foreign Application Priority Data
May 19, 2016 (IT) .................. 102016000051644

(51) Int. Cl.
*G05D 1/02* (2020.01)
*B25J 9/16* (2006.01)

(52) U.S. Cl.
CPC .......... *B25J 9/1682* (2013.01); *B25J 9/1661* (2013.01); *B25J 9/1664* (2013.01); *B25J 9/1666* (2013.01);
(Continued)

(58) Field of Classification Search
CPC ...... B25J 9/1676; B25J 9/1664; B25J 9/1633; B25J 9/1666; B25J 9/1674; G05D 1/0214;
(Continued)

(56) References Cited

U.S. PATENT DOCUMENTS 8,315,735 B2 * 11/2012 Nihei .................. B25J 9/1676
700/245
9,333,652 B2 * 5/2016 Hu ...................... B25J 9/1697
10,239,209 B2 * 3/2019 Kimoto ................ B25J 9/1671

FOREIGN PATENT DOCUMENTS

| DE | 103 24 627 A1 | 1/2005 |
| JP | 2010 208002 A | 9/2010 |
| WO | 2014/048444 A1 | 4/2014 |

OTHER PUBLICATIONS

Andrea Maria Zanchettin et al., *Safety in Human-Robot Collaborative Manufacturing Environments: Metrics and Control*, IEEE Transactions on Automation Science and Engineering, vol. 13, No. 2, Apr. 2016, pp. 882-893.

(Continued)

*Primary Examiner* — Dalena Tran
(74) *Attorney, Agent, or Firm* — Workman Nydegger

(57) ABSTRACT

A method for controlling the motion of one or more collaborative robots is described, the collaborative robots being mounted on a fixed or movable base, equipped with one or more terminal members, and with a motion controller, the method including the following iterative steps: —determining the position coordinates of the robots, and the position coordinates of one or more human operators collaborating with the robot; —determining a set of productivity indices associated with relative directions of motion of the terminal member of the robot, the productivity indices being indicative of the speed at which the robot can move in each of the directions without having to slow down or stop because of (Continued)

the presence of the operator; —supplying the controller of the robot with the data of the set of productivity indices associated with the relative directions of motion of the terminal member of the robot, so that the controller can determine the directions of motion of the terminal member of the robot based on the higher values of the productivity index.

6 Claims, 6 Drawing Sheets

(52) U.S. Cl.
CPC ..... *B25J 9/162* (2013.01); *G05B 2219/39082* (2013.01); *G05B 2219/39091* (2013.01); *G05B 2219/39135* (2013.01); *G05B 2219/40371* (2013.01); *G05B 2219/40507* (2013.01)

(58) Field of Classification Search
CPC ............ G05D 1/02; G05B 2219/40202; G05B 2219/40203; G05B 2219/49157; G05B 2219/39091; G05B 2219/40201
USPC .................................................. 700/245, 255
See application file for complete search history.

(56) References Cited

OTHER PUBLICATIONS

Matteo Ragaglia et al., *Integration of Perception, Control and Injury Knowledge for Safe Human-Robot Interaction*, 2014 IEEE International Conference on Robotics & Automation (ICRA), May 31-Jun. 6, 2014, pp. 7.
Italian Search Report dated Feb. 8, 2017, issued in Italian Application No. IO 64804 IT UA20163608.
International Search Report and Written Opinion dated Sep. 13, 2017, issued in PCT Application No. PCT/IB2017/052932, filed May 18, 2017.
Matteo Ragaglia et al., *Safety-Aware Trajectory Scaling for Human-Robot Collaboration with Prediction of Human Occupancy*, International Conference on Advanced Robotics (ICAR), 2015, pp. 85-90.
*Robots and Robotics Devices—Collaborative Robots*, Technical Specification, ISO/TS 15066, Feb. 15, 2016, pp. 40.
*Robots and Robotic Devices, Safety Requirements for Industrial Robots—Part 1: Robots* (ISO 10281-1:2011), pp. 56.
*Robots and Robotic Devices, Safety Requirements for Industrial Robots—Part 2: Robots System and Integration* (ISO 10218-2:2011), pp. 86.

\* cited by examiner

METHOD AND DEVICE FOR CONTROLLING THE MOTION OF ONE OR MORE COLLABORATIVE ROBOTS

BACKGROUND OF THE INVENTION

Field of Application of the Invention

The present invention refers to the field of robotics and more precisely to collaborative robotics, and concerns a method and device for controlling the motion of one or more collaborative robots.

State of the Art

The invention applies in the framework of industrial collaborative robotics. As known, the term collaborative robot means an industrial manipulator that can be put in operation without the use of protective barriers (physical, optical, etc.) to protect the human operator who could potentially come into contact with the robot.

Until the recent past, industrial robotics provided for the rigid segregation of robots in protected environments by means of physical infrastructures (railings or optical barriers).

Today there is increasing awareness of the advantages that can be obtained by direct collaboration between man and robot, obtained through so-called collaborative robotics, by means of which it is possible to share the spaces between man and robot, and to a certain extent also to make them collaborate in performing sequences of operations.

The robot thus becomes a "workmate" of man.

Thus, problems arise in terms of ergonomics, but particularly physical safety for the people who could potentially come into contact with said robot, due to the possibility of absence of protective barriers, so that the operator and the various elements of the robot and of its terminal member can be very close to one another, sometimes even coming into direct contact.

For safety reasons, so-called "collaborative" robots must satisfy a certain number of standards and technical specifications. For example, standard UNI EN ISO 10218 (July 2011), in its two parts, defines the safety requirements for collaborative robots and the corresponding terminal members. Specifically, four man-robot collaboration modes are defined: hand-over window, interface window, inspection and collaborative workspace. Whereas the first suggest the presence of areas dedicated to interaction and their clear definition, in the others there is the possibility of operating collaboratively and continuously and not simply sporadically. The safety requirement that they share provides for the speed of the robot being controlled and reduced as a function of the minimum safety distance with respect to the operator. This situation creates clear problems of limitation of productivity.

Recently a technical specification ISO TS/15066 has been issued that provides for the possibility for the robot to continue carrying out the processing, even in situations of extreme closeness to the operator, provided that the forces involved and the possible energy transferred during an accidental collision are kept below certain thresholds, still under debate, but certainly less than the pain threshold.

However, there is a reduction of the operativity of robots, including stopping, to ensure human safety, which causes significant industrial problems in terms of productivity and efficiency of the robots.

An example of a system for controlling a collaborative robot that suffers from the problems outlined above is described in patent application WO2014048444 A1, in which said control system operates in a context oriented towards the safety and comfort of the operator rather than the productivity of the robot or of the system consisting of the robot and the human operator.

SUMMARY OF THE INVENTION

The object of the present invention is a method and device for controlling the motion of one or more collaborative robots adapted for overcoming the aforementioned drawbacks.

The idea forming the basis of the present invention concerns the definition and the corresponding calculation of directions of motion for the terminal member (end-effector) of one or more industrial robots such as to optimize productivity, based on predetermined safety conditions.

Once this information on the directions of motion of optimal productivity is known, it is possible for the robot, in the case of the presence of obstacles to its pre-programmed motion, to choose alternative directions to the pre-programmed one along which to continue its motion, thus maintaining its productivity, and subordinately, slowing down or even stopping when none of the possible alternatives is such as to allow the robot to continue its task.

The present invention allows the optimization of any one of the following productivity factors of the robot, including their combination: speed or execution time of the tasks (they are dual: optimizing the speed also means optimizing the time and vice-versa), industrial profitability of the tasks (priority is given to the most profitable tasks among those that can be performed), energy efficiency. Hereinafter, only as an example, reference will be made to the optimization of speed as a productivity factor.

An object of the present invention is a method for controlling the motion of one or more collaborative robots, said one or more collaborative robots being mounted on a fixed or movable base, equipped with one or more terminal members, and with a controller of said motion, characterized in that it comprises the following iterative steps:

determining the position coordinates of each one of said one or more collaborative robots and the position coordinates of one or more human operators collaborating with said one or more collaborative robots;

determining a set of productivity indices associated with relative directions of motion of said one or more terminal members of said one or more collaborative robots, said productivity indices being indicative of the speed at which said one or more collaborative robots can move in each one of said directions without having to slow down or stop because of the presence di said one or more human operators;

supplying to said motion controller the data of said set of productivity indices associated with said respective directions of motion of said one or more terminal members, so that said controller can determine the directions of motion of said one or more terminal members based on the higher values of said productivity indices.

Preferably said method for controlling the motion of one or more collaborative robots comprises a step in which said motion controller, based on said data of set of productivity indices associated with said relative directions of motion of said one or more terminal members, decides to take one of the following actions:

executing a direction of motion or path which is alternative to a pre-programmed direction;

executing a new path with an alternative final position, possibly not known a priori, which is different from a pre-programmed final position;

slowing down the motion of the robot.

stopping the motion of the robot.

Another object of the present invention is a device for carrying out the method.

A particular object of the present invention is a method and device for controlling the motion of one or more collaborative robots, as better described in the claims, which form an integral part of the present description.

BRIEF DESCRIPTION OF THE FIGURES

Further purposes and advantages of the present invention will become clearer from the following detailed description of an embodiment thereof (and of variants thereof), and with reference to the attached drawings given purely for explaining and not limiting purposes, in which.

The same reference numerals and letters in the figures identify the same elements or components.

DETAILED DESCRIPTION OF EMBODIMENTS

Figure 1:
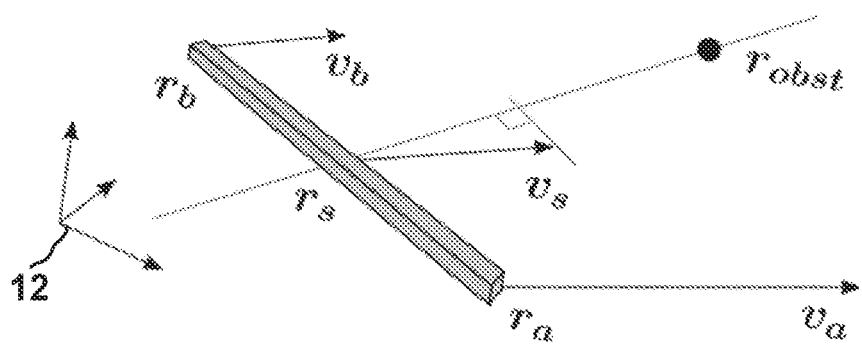
FIG. 1 shows a rigid rod to represent the generic link (see paragraph 3.6 in standard ISO 8373:2012) of the robot and a pointed obstacle.

The system object of the invention applies to a collaborative robotics station that is made up of one or more industrial collaborative robots with series kinematics (i.e., a robot the links of which do not form closed kinematic chains), including the relative control system(s), which human operators are permitted to approach, so as to satisfy the aforementioned current safety standards.

Hereinafter, consideration will be given to the text of standard ISO 8373:2012 integrated entirely for reference in the present description.

The system is able to determine the presence and the position of one or more human operators, to estimate the time evolution of the position of the operator, and to interface with the control system of the robot(s), so as to:

define directions of motion for the terminal member of said one or more collaborative robots such as to maximize productivity, preserving safety conditions;

offer the possibility of said one or more collaborative robots selecting alternative directions along which to continue its movement, thus maintaining its productivity, and subordinately, slow down till stopping when none of the aforementioned directions is such as to allow the robot to continue its task.

The method object of the invention is based on the following main characteristics:

(1) based on the position of the robot(s), mounted on fixed or mobile bases, and of the operator(s) and possibly of the prediction of their future position, it is capable, for each robot, of associating a determined direction of motion of the terminal member with a productivity index that indicates how quickly (or effectively if the productivity is not associated with the speed, but rather with the profitability or the efficiency of the tasks) the robot can proceed in a given direction without having to slow down or stop because of the presence of an operator;

(2) it determines the main directions of motion of each manipulator, organized in a decreasing manner as a function of a productivity index;

(3) it allows interfacing with the controller of the robot(s) for the purpose of the implementation of said functionality;

(4) it gives the robot(s) with which it communicates the possibility of modifying its path along the directions defined, without the need for these modifications to already be present and/or known a priori by the controller of the same robot(s);

(5) it allows wireless interfacing with WiFi interface network for communication with other devices (for example tablets, smartphones, etc.) for the configuration and/or the remote monitoring of the activity of the device itself and of the robot(s).

Therefore, the method for controlling the motion of one or more collaborative robots of the present invention substantially provides for the following iterative steps:

determining the position coordinates of each collaborative robot, and the position coordinates of one or more human operators collaborating with the collaborative robots;

determining a set of productivity indices associated with relative directions of motion of the terminal members of the collaborative robots: the productivity indices are values proportional to the maximum speed at which the collaborative robots can move in each one of the directions without having to slow down or stop because of the presence of the human operators;

supplying to the motion controller the data of the set of productivity indices associated with the relative directions of motion of the terminal members, so that the controller can determine the directions of motion of the terminal members based on the higher values of the productivity indices.

Hereinafter, a brief summary of the closest prior art to the object of the present invention is given, as described in the publication: M. Ragaglia, A.M. Zanchettin, P. Rocco, "Safety-aware trajectory scaling for human-robot collaboration with prediction of human occupancy", International Conference on Advanced Robotics (ICAR), 2015, pages 85-90. Said publication is considered integrated entirely in the present description.

The safety standards in man-robot interaction impose that at all times it is necessary to satisfy a relationship that can be generically expressed as:

$$V \cdot T_s \leq \max(0, S - \Delta) \quad (1)$$

where V is the speed of the robot, $T_s$ is the stop time (i.e., the time necessary for the motion of the robot to come to a complete stop), S is the relative distance between robot and man, $\square$ is a safety parameter.

Let us consider a generic element (link) of the kinematic chain that constitutes the industrial robot, and on such a link, a generic point of coordinates $r_s$ with respect to a spatial reference system 12 (see FIG. 1).

Using $v_s$ to represent the speed of the aforementioned point and $r_{obst}$ to represent the position of an obstacle measured in the same reference system in which the position $r_s$ is measured, the inequality (1) relative to the single point can be expressed as:

$$v_s^T \frac{r_{obst} - r_s}{\|r_{obst} - r_s\|} T_s \leq \max(0, \|r_{obst} - r_s\| - \Delta) \quad (2)$$

where $v_s^T$ is the transposed matrix of the vector $v_s$, whereas $\|r_{obst} - r_s\|$ is the Euclidean norm of the vector $r_{obst} - r_s$.

The formula (2) can equivalently be expressed as:

$$v_s^T (r_{obst} - r_s) T_s \leq \max(0, \|r_{obst} - r_s\|^2 - \Delta \|r_{obst} - r_s\|) \quad (3)$$

Position $r_s$ and speed $v_s$ of the generic point on the link can be expressed as a function of the positions and of the speeds of the extreme points ($r_a$ and $r_b$, $v_a$ and $v_b$ respectively) as follows:

$$r_s = r_a + s(r_b - r_a)$$

$$v_s = v_a + s(v_b - v_a) \quad (4)$$

with $s \in [0, 1]$. Processing the previous relationships, gives:

$$\alpha + \beta s \leq g(s), \forall s \in [0,1] \quad (5)$$

where:

$$\alpha = T_s v_a^T (r_{obst} - r_a)$$

$$\beta = T_s (v_b - v_a)^T (r_{obst} - r_a) - T_s v_a^T (r_b - r_a)$$

$$g(s) = [\max(0, \|r_{obst} - r_s\| - \Delta)]^2 \quad (6)$$

The left member of the relationship (5) is a linear function in s: this means that sufficient safety conditions are obtained by evaluating (5) at the ends of the rod:

$$\alpha \leq \min_s g(s)$$

$$\alpha + \beta \leq \min_s g(s) \quad (7)$$

where exchanging the operations of min and max at the right member, gives:

$$\min_s g(s) = \left[\max\left(0, \min_s \|r_{obst} - r_s\| - \Delta\right)\right]^2 \quad (8)$$

The term $\min_s \|r_{obst} - r_s\| - \Delta$ represents, if positive, the distance between a sphere of radius $\Delta$ centered in the point $r_{obst}$ and the rod ends $r_a$ and $r_b$.

Combining (6) and (7) gives:

$$\alpha = T_s (r_{obst} - r_a)^T v_a \leq \min_s g(s) \quad (9)$$

$$\alpha + \beta = T_s (r_{obst} - r_a)^T v_b - T_s (r_b - r_a)^T v_a \leq \min_s g(s)$$

Let us now introduce the vector $\dot{q}$ that represents the joint speeds of the manipulator: these are the time derivatives of the joint coordinates q, angular positions or linear displacements (depending on whether the joint is rotoidal or prismatic) that express the relative position of one link with respect to the previous one. Using n to indicate the number of links (and joints) of the robotic manipulator, q and $\dot{q}$ are both vectors of dimensions n.

It is possible to link the linear speed $v_a$ of the first end of the link to the joint speeds $\dot{q}$ by means of a matrix, called Jacobian matrix, dependent on the joint coordinates q. Analogously for the speed $v_b$ of the second end:

$$v_a = J_a(q)\dot{q}$$

$$v_b = J_b(q)\dot{q} \quad (10)$$

The Jacobian matrices $J_a$ and $J_b$ both have dimension (3×n).

Numbering the n links of the robotic manipulator with the index i (i=1, . . . , n) and combining the relationships (9) and (10), the criterion of minimum distance of the obstacle in position $r_{obst}$ relative to the link i can be expressed in the following form:

$$E_i(r_{obst}, q)\dot{q} \leq f_i(r_{obst}, q) \quad (11)$$

where:

$$E_i(r_{obst}, q) = \begin{bmatrix} (r_{obst} - r_{ai})^T J_{ai} \\ (r_{obst} - r_{ai})^T J_{bi} - T_s (r_{bi} - r_{ai})^T J_{ai} \end{bmatrix} \quad (12)$$

$$f_i(r_{obst}, q) = \frac{1}{T_s} \min_s g_i(s) \begin{bmatrix} 1 \\ 1 \end{bmatrix} \quad (13)$$

where $r_{ai}$ and $r_{bi}$ are the coordinates of the end points of the link i, $J_{ai}$ and $J_{bi}$ are the Jacobian matrices of the speeds of the aforementioned points, whereas:

$$\min_s g_i(s) = \left[\max\left(0, \min_s \|r_{obst} - r_{si}\| - \Delta\right)\right]^2 \quad (14)$$

$r_{si}$ is the vector of the coordinates of the generic point along the link i.

The matrix $E_i$ has dimensions (2×n) whereas the vector $f_i$ has two components. The dependence of both magnitudes on the position $r_{obst}$ of the obstacle is a direct consequence of their definition, whereas the dependence on the vector of the joint coordinates q derives from the fact that the positions of the ends $r_{ai}$ and $r_{bi}$ and of the generic point $r_{si}$ depend on such joint coordinates.

Figure 2:
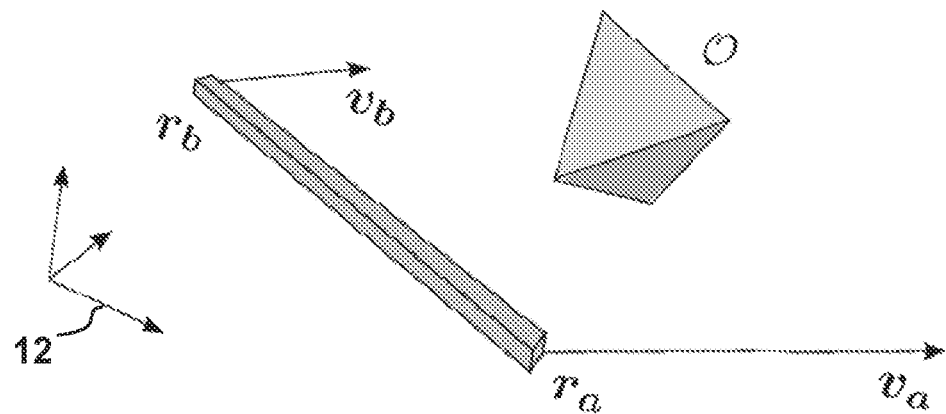
FIG. 2 extends what is shown in FIG. 1 in the case of a generic, not pointed obstacle.

Let us now consider an obstacle consisting of a generic object O represented by a convex (polytopic) solid, like in FIG. 2.

In this case the condition (11) should be conceptually expressed for all of the infinite points belonging to the object. A sufficient condition so that the relationship is valid for every point is that the following relationship is satisfied:

$$E_i(r_{obst}, q)\dot{q} \le \frac{1}{T_s} d_i(O, q)\begin{bmatrix} 1 \\ 1 \end{bmatrix}, \forall r_{obst} \in O \qquad (15)$$

where $d_i(O, q)$ is the minimum distance from the link i to the obstacle O, able to be calculated with one of the algorithms available in the literature (for example the GJK algorithm).

The relationship (15) can then be calculated (by linearity given the convexity of the object) only in the vertices of the obstacle:

$$E_i(r_{verj}, q)\dot{q} \le \frac{1}{T_s} d_i(O, q)\begin{bmatrix} 1 \\ 1 \end{bmatrix}, \forall j: r_{verj} \in vert(O) \qquad (16)$$

Summarizing, for every link i of the robot and for all of the η points at the vertices of all of the obstacles it is necessary for relationship (16) to be satisfied.

Let us thus introduce the vector p that encompasses the coordinates $p_j$ of all of the points at the vertices of the obstacles: p will thus have a number of components equal to 3*η.

Let us then define the matrix, of dimensions (2*n*η×n):

$$E(p, q) = \begin{bmatrix} E_1(p_1, q) \\ \vdots \\ E_1(p_\eta, q) \\ E_2(p_1, q) \\ \vdots \\ E_2(p_\eta, q) \\ \vdots \\ E_n(p_1, q) \\ \vdots \\ E_n(p_\eta, q) \end{bmatrix} \qquad (17)$$

And the vector of dimensions 2*n*η:

$$f(p, q) = \begin{bmatrix} \frac{1}{T_s} d_1(O, q)\begin{bmatrix}1\\1\end{bmatrix} \\ \vdots \\ \frac{1}{T_s} d_1(O, q)\begin{bmatrix}1\\1\end{bmatrix} \\ \frac{1}{T_s} d_2(O, q)\begin{bmatrix}1\\1\end{bmatrix} \\ \vdots \\ \frac{1}{T_s} d_2(O, q)\begin{bmatrix}1\\1\end{bmatrix} \\ \vdots \\ \frac{1}{T_s} d_n(O, q)\begin{bmatrix}1\\1\end{bmatrix} \\ \vdots \\ \frac{1}{T_s} d_n(O, q)\begin{bmatrix}1\\1\end{bmatrix} \end{bmatrix} \begin{matrix} \forall O, \forall vert(O) \\ \\ \forall O, \forall vert(O) \\ \\ \forall O, \forall vert(O) \end{matrix} \qquad (18)$$

With these positions, the safety constraint can be expressed by the inequality:

$$E(p,q)\dot{q} \le f(p,q) \qquad (20)$$

At a certain moment in time, the current state of the robot is safe if the condition in the previous relationship is verified.

In relationship (20), E is a matrix of dimensions (2*n*η× n), where n is the number of joints of the robot and η is the number of points detected by the device that monitors the position of the operator. f is a vector of 2*n*η components. q is a vector with n components that identifies the configuration of the robot (like in the definition 3.5 of standard ISO 8373:2012), and thus contains the n angular positions of the joints. $\dot{q}$ is a vector with n components that at each moment contains the time derivatives of the components of the vector q and thus the speeds of the joint coordinates. p is a vector of 3*η components that contains, for each of the η points detected on the operator, the 3 position coordinates. Such a vector can also contain the positions of such points, predicted at future moments.

If the obstacle is an operator, p contains the coordinates of some points detected on the body (for example: shoulders, head, elbow, hands).

The calculation of the matrix E and of the vector f thus requires knowledge of the coordinates q of the joints of the robot: they are available at all times by interrogating the controller of the robot. The calculation also requires knowledge of the coordinates p of the points detected on the operator. The ways in which the coordinates of such points are obtained is not relevant for the invention. On the market there are devices (depth cameras) that are able to return the information requested. The way in which the position of the points of the person is inserted in the calculation of the matrix E and the way in which it is possible to take into account the position taken up by such points in the following moments are described in detail in the aforementioned article [ICAR 2015].

The object of the invention concerns the use of some indices derived from such matrices to determine the best direction of motion for the robot.

In particular, the invention exploits the geometric structure of the aforementioned matrices, obtained from the Singular Value Decomposition (SVD):

$$E = USV^T \qquad (21)$$

As known from the theory of singular value decomposition, U is an orthogonal square matrix of dimensions (2*n*η×2*n*η), S is a matrix of dimensions (2*n*η, n) containing the so-called singular values of the matrix E, V is an orthogonal square matrix of dimensions (n×n), $V^T$ is the transposed matrix of V.

The matrix V contains an organized set of directions (orthonormal vectors) in the space of the joints (see the definition 4.7.4 of standard ISO 8373:2012) in which the robot is potentially more or less productive. Indeed, using $v_i$ to indicate the i-th column of the matrix V or of the matrix −V, a variable that can be easily determined is the maximum speed able to be obtained in such a direction, such as not to violate the safety requirement (20). For this reason, for each of the directions $v_i$, it is necessary to set up the optimization problem:

$$\varphi_i^{max} = \max\{\varphi\} \qquad (21)$$

such that:

$$\varphi E(p,q)v_i \le f(p,q)$$

$$|\varphi v_i| \le \dot{q}_{max} \qquad (22)$$

where $\dot{q}_{max}$ is the vector of the maximum speeds that the single joint coordinates can assume and the second of the conditions (22) is taken element by element of the vectors involved.

For each of the directions $v_i$, in the space of the joints of the manipulator, it thus concerns determining the maximum intensity $\varphi_i^{max}$ of the speed $\varphi v_i$, so that such a speed respects the safety constraint and is element for element lower than the maximum allowed.

The value of the index i such that the corresponding value $\varphi_i^{max}$ is higher corresponds to the best direction (in the space of the joints) in which the robot can move, without having to slow down significantly its speed due to the presence of the human operator.

However, it is of greater interest to relate the productivity to the base coordinates system (see the definition 4.7.2 of standard ISO 8373:2012), rather than to the space of the joints. For this reason the Jacobian matrix J(q), of dimensions (3×n), is used, which links the linear speed of the characteristic point of the terminal member TCP (Tool Centre Point, definition 4.9 of standard ISO 8373:2012) to the speeds in the space of the joints, according to the relationship:

$$v_{TCP} = J(q)\dot{q} \quad (23)$$

The speed $\varphi_i^{max} v_i$ in the space of the joints will thus result in the following speed of the TCP:

$$\varphi_i^{max} J(q) v_i \quad (24)$$

For each value of the index i, the Euclidean norm of the vector given in (24):

$$\|\varphi_i^{max} J(q) v_i\| \quad (25)$$

represents the productivity index of the direction in the base coordinates system, identified by the unitary vector:

$$\frac{\varphi_i^{max} J(q) v_i}{\|\varphi_i^{max} J(q) v_i\|} \quad (26)$$

Expressions (25) and (26) jointly represent a method for determining the direction in the base coordinates system in which the robot can move without danger of having to decrease its speed due to the presence of the human operator, maximizing productivity.

As an example, two possible ways of use of the directions of motion and of the productivity indices associated with them are given.

Figure 5:
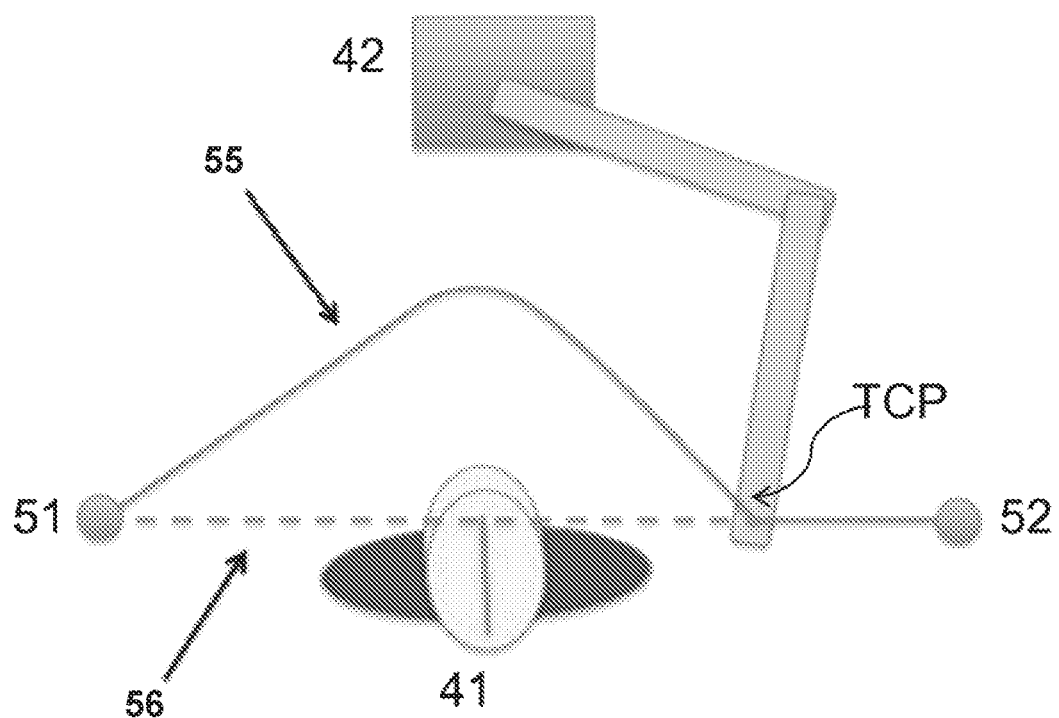
FIGS. 5 and 6 show two possible modes of use of the result of the method object of the present patent.

FIG. 5 shows a first way of use in which the robot 42, with a terminal member TCP, exploits one of the directions calculated to modify its original path, adding a fly-by point (definition 5.7 of standard ISO 8373:2012) before reaching its target 51 (Destination Station) starting from a starting station 52. In FIG. 5 it is possible to see the solid curved line 55, as a deviation with respect to the dashed straight line 56 that intercepts an operator 41. Of particular relevance is the description of the way in which the result of the operations shown in the flow diagram of FIG. 3, described hereinafter, can be used to determine the initiation point.

Using x to indicate the current position of the characteristic point of the terminal member TCP in the base coordinates calculated through forward kinematics (see the definition 4.1 of standard ISO 8373:2012), the initiation point can be calculated as:

$$x + \delta T_s \varphi_i^{max} J(q) v_i \quad (27)$$

In (27) $\delta$ is a generic number comprised between 0 and 1, i.e., $0 < \delta < 1$, whereas $T_s$ is the stop time, already introduced in (1). For its definition reference should be made to standard EN 60204-1 and in particular to the stop of category 1. The parameter $\delta$ can be used to determine how much the trajectory of the robot can depart from the pre-defined path. It is advantageous to select a high value (close to one) for such a value if the terminal member of the robot is sufficiently far from its target, and a lower value (close to zero, but still positive) when the robot is already close to the work station that it must reach. As an example, such a parameter can be selected as the cosine of the angle between the vector joining the current position of the robot and the corresponding target and the vector corresponding to the direction of productivity (26), multiplied by the corresponding productivity index (25) and by the stop time.

For the selection of the best fly-by point, the following is carried out:
(1) determine the optimal productivity directions that do not take the robot away from its target;
(2) among these directions select the one associated with the maximum value of the productivity index in (25), in the case of more than one optimal direction, the first it taken arbitrarily.
(3) determine the value $\delta$, for example as described earlier;
(4) temporarily interrupt the motion of the robot
(5) add a fly-by point calculated like in (27)
(6) update the journey towards the target point
(7) reset the motion of the robot.

Figure 6:
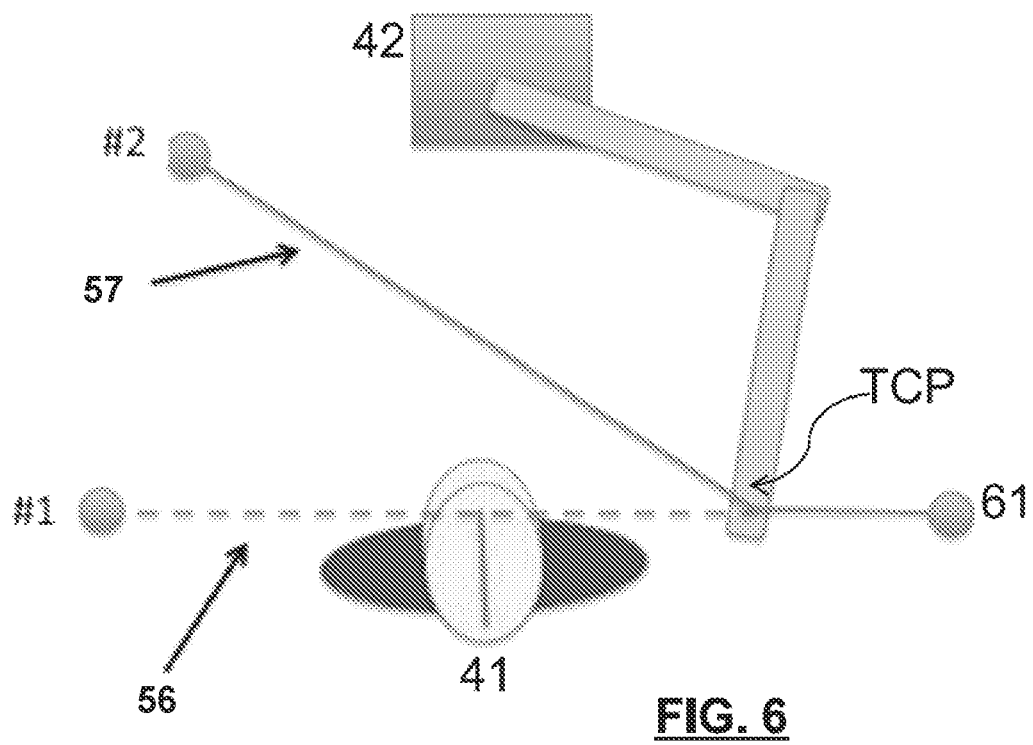

A second example of use is given in FIG. 6. In particular, in this case it is possible for the terminal member TCP of the robot 42 to totally abandon the execution of the current task, which, starting from station 61, would involve approaching destination station #1, to carry out a certain operation, in favour of a new task to be carried out at the destination station #2. Dashed line 56 represents the path to destination station #1 while solid 57 represents the path to destination station #2. In this case, the directions determined in the method object of the present invention, together with the productivity indices defined previously, can be used to determine which station is easier to reach as a function of the safety constraints and from the current position of the operator detected with the points p. The directions of optimal productivity (26) and the relative indices (25) are used to determine the easiest target to reach among all of the possible alternatives. In particular calling the possible alternative targets $x_j$:
(1) the direction of productivity (26) most similar to the direction that joins the current position of the robot x to the target $x_j$ is determined;
(2) the estimated time to reach each target is determined as the ratio between the distance between the current position x and the target $x_j$ and the corresponding productivity index;
(3) the target that minimizes such a value is selected.

Figure 3:
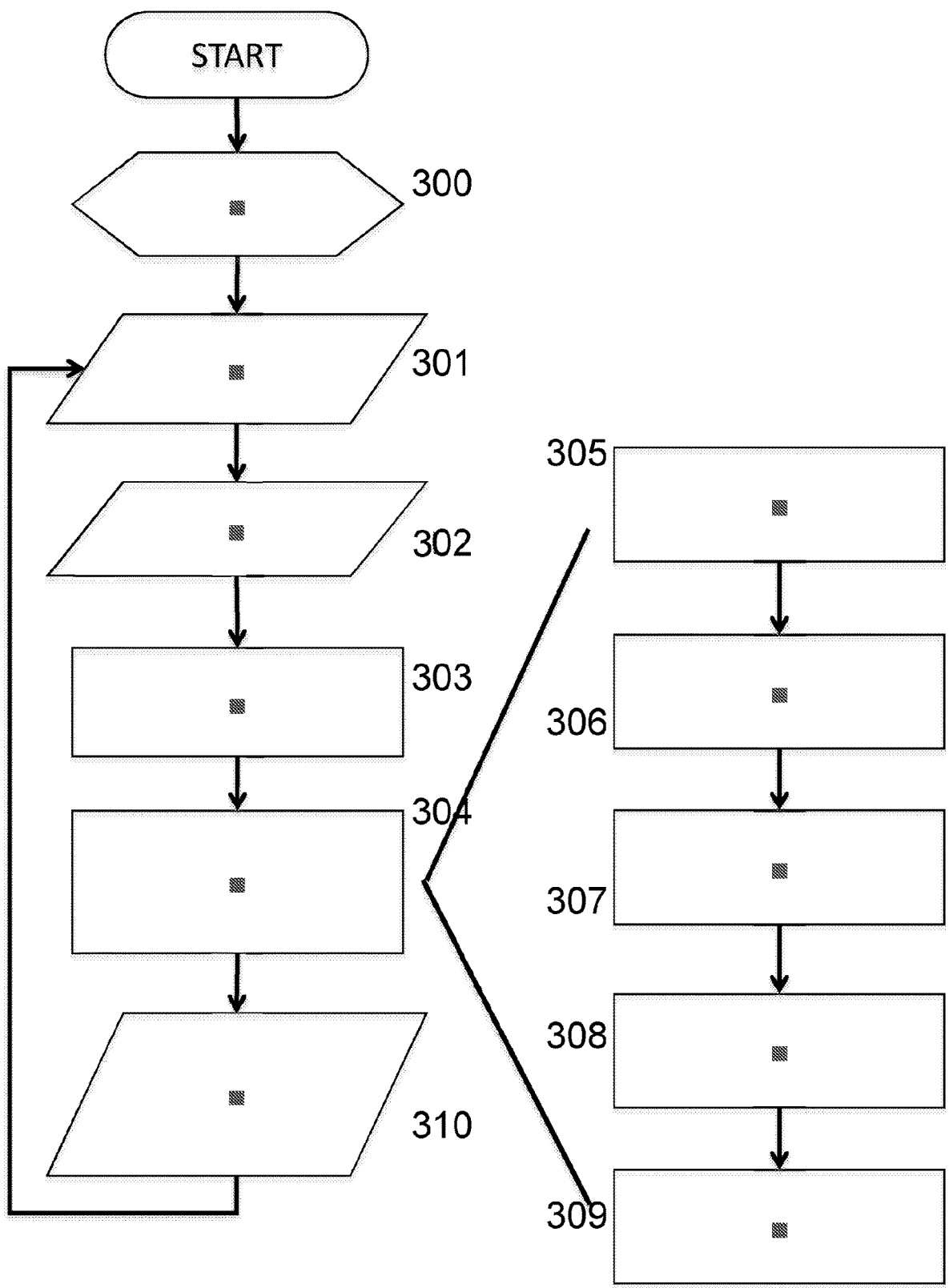
FIG. 3 indicates a flow diagram of the program that implements a part of the method object of the present invention.

With reference to FIG. 3 the operative flow diagram of the method object of the invention is now described.

After the operative start step, there is the setup of the algorithm and of the data structures (block 300). In particular, in the initialization step, the algorithm that implements the method object of the present invention reads from a suitable configuration file all the information relative to the kinematic structure of the robot (lengths of the links, see point 3.6 of standard ISO 8373:2012, and other kinematic parameters) and of the detection device of the points on the obstacle, hereinafter defined "sensor" (position and absolute orientation of the sensor with respect to the global coordinates reference system, etc.). Other relevant information concerns the mode of communication between the device that implements the method described here and the robot (protocol, TCP/IP port, IP address of the robot(s), etc.).

Then the configuration of the robot(s) (block 301) is read cyclically, with a suitable frequency, i.e., the linear/angular positions of each axis of motion, collected in the vector q, and their speeds (time derivatives of the above) q̇ are determined.

Then the position values of a (configurable) number η of points detected by the sensor on the operator are read, collecting their coordinates in the vector p. (block 302).

Then comes the calculation of the formula (20) expressed above, in other words the calculation of the matrix E(p,q) and of the vector f (p,q). (block 303).

Then the productivity indices are determined based on the matrix E(p,q) and on the vector f(p,q). (block 304).

In detail, this point is articulated in the following passages:

The Jacobian matrix J(q) of the terminal member TCP of the robot (block 305) is calculated;
The singular value decomposition (SVD) of the matrix E is calculated, obtaining the matrices U, S and V, like in (21) (block 306);
The matrix V* containing the columns of the matrices V and −V (block 307) is constructed;
For every column i of V* the corresponding $\varphi_i^{max}$ is calculated solving the problem (21)-(22) (block 308);
For every column i of V* the directions of motion of the TCP and the corresponding productivity indices are calculated according to (25) and (26) (block 309).

Finally, the directions of motion and the productivity indices thus calculated are sent to the controller of the robot (block 310).

The operations of blocks 301-310 are carried out cyclically with a certain time period.

Figure 4:
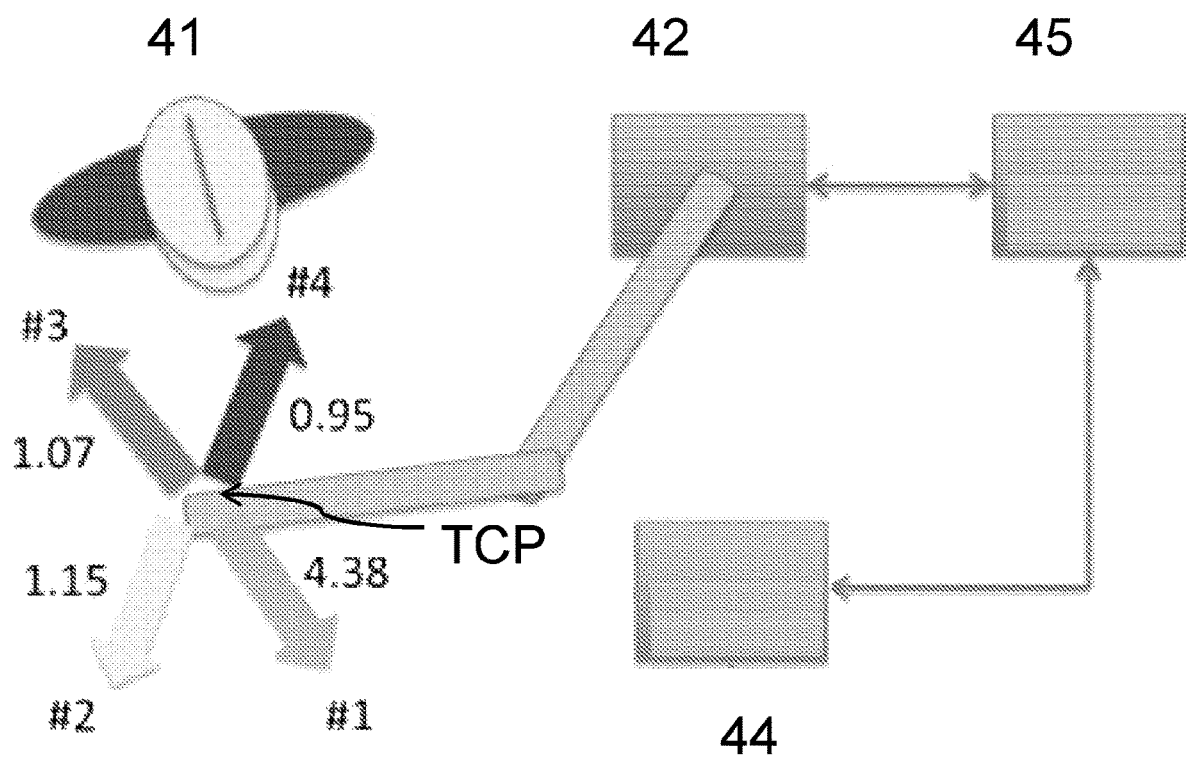
FIG. 4 shows, as an example, a possible application scenario consisting of a robot, an operator, and a device that monitors the relative position of the robot and of the operator that carries out all of the instructions necessary to implement the method object of the present invention.

With reference to FIG. 4, a block diagram of the system in which the device object of the invention operates is shown in an operative condition.

As an example, the case is shown of a single operator 41 and of a single planar robot 42, comprising a terminal member TCP, for which four possible directions are highlighted, organized as a function of the corresponding productivity index. Four values #1-#4 are given, as a function of the direction of theoretical movement of the terminal member of the robot. It should be noted that the index of greatest value is the one that faces in the opposite direction to that of presence of the operator.

The device 44 object of the invention, which communicates bidirectionally with the controller 45 of the robot, comprises at least one vision system, for example depth cameras defined above, of the per se known type, adapted for cyclically determining the position data p (shoulders, elbow, hands, etc.) over time of the operator(s).

The device 44 also receives from the controller 45 the current position data of the robot q and calculates the speed thereof (comparing the current position with that at the immediately preceding moment). These data are updated cyclically.

These two pieces of information (current position and speed), together with the kinematic structure of the robot (which is supplied to the device in the installation/configuration step) are sufficient for the application of the method object of the invention described above.

Figure 7:
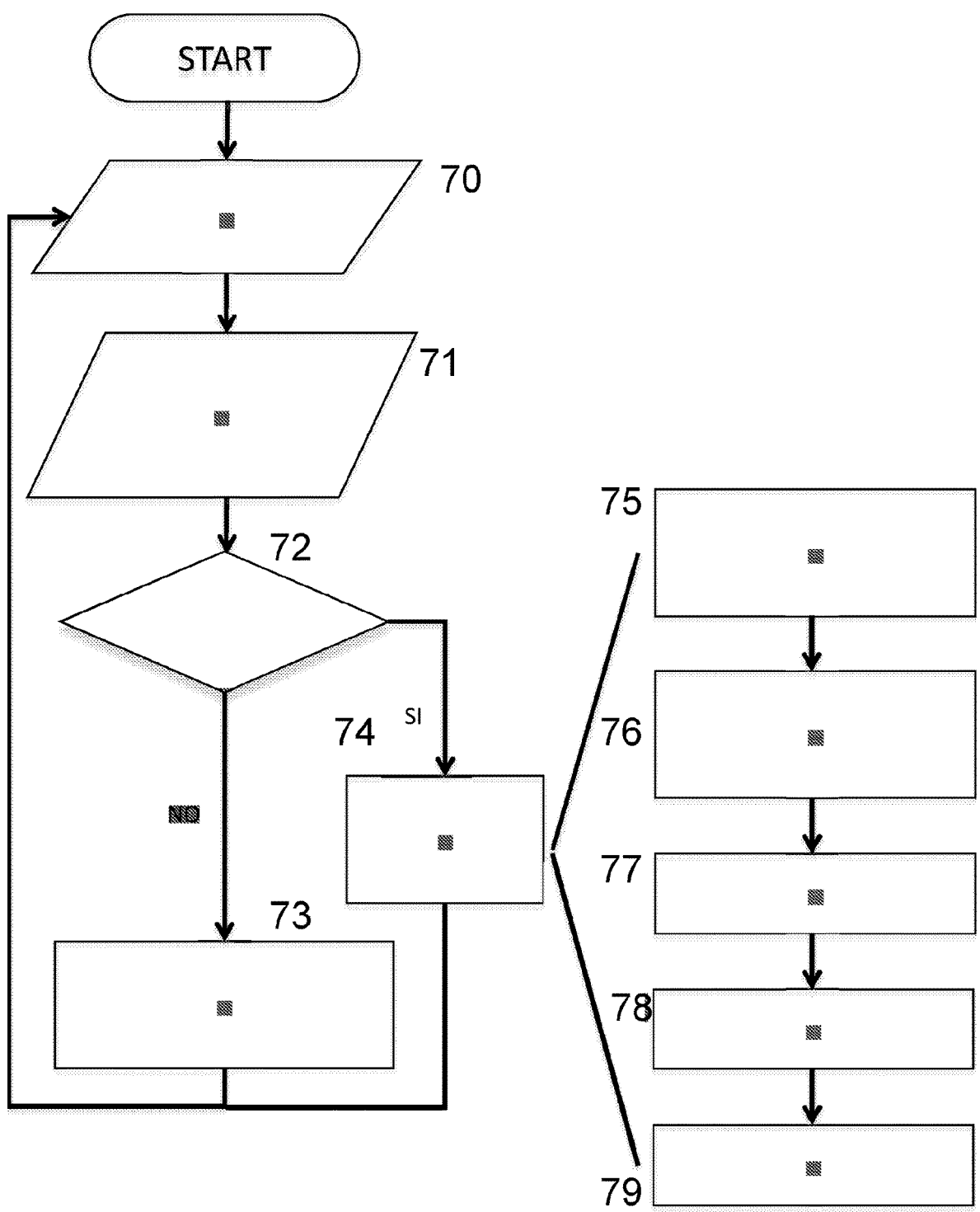
FIG. 7 shows a flow diagram of the program that the controller of the robot can execute based on the results calculated by the device according to FIG. 4 based on the present invention, in the case of execution of an alternative path to the pre-programmed one.
Figure 8:
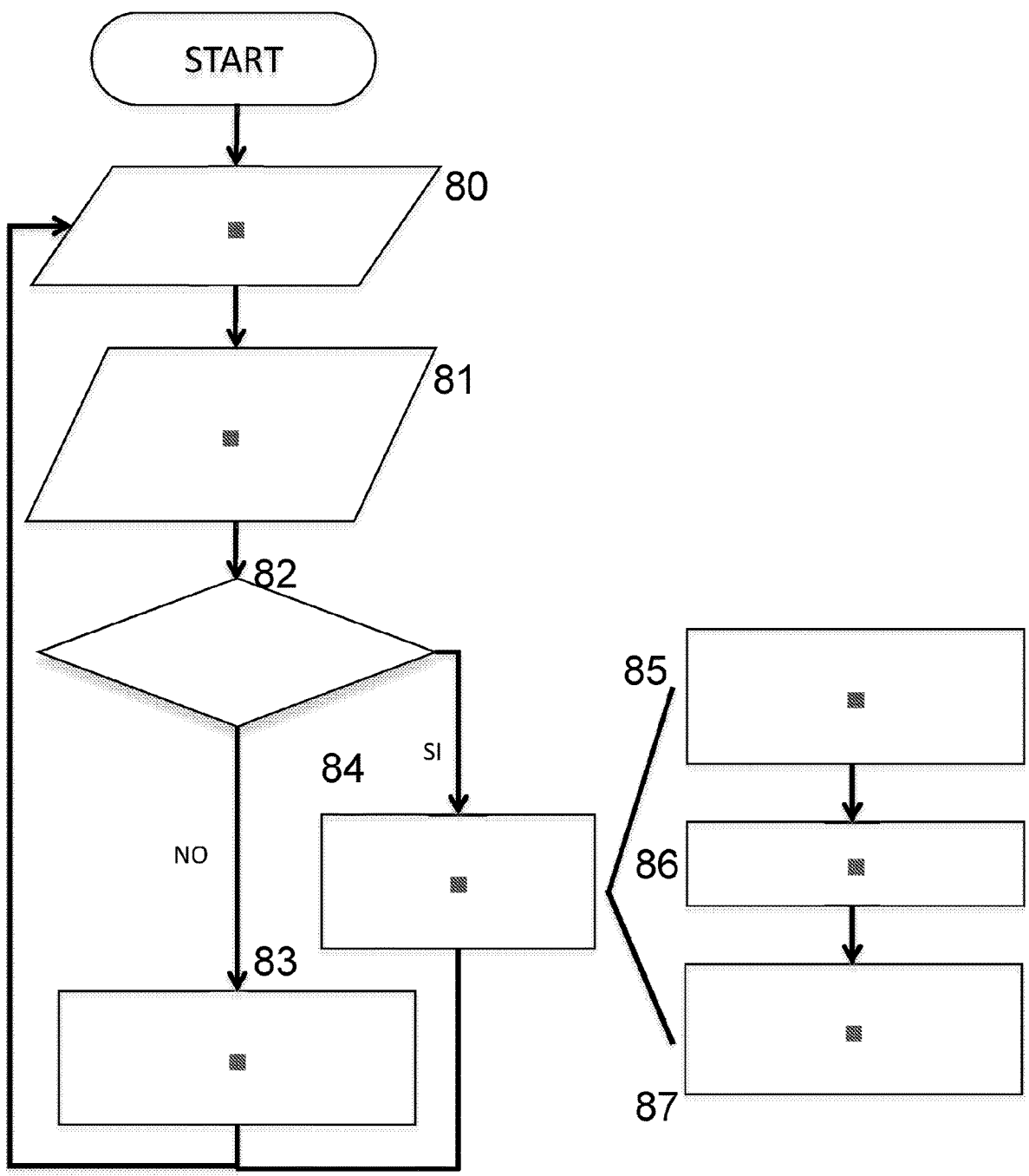
FIG. 8 shows a flow diagram of the program that the controller of the robot can execute based on the results calculated by the device according to FIG. 4 based on the present invention, in the case of execution of a new path with alternative final position, possibly not known a priori, which is different from the pre-programmed final position.

As far as the use by the robot of the productivity indices, calculated in accordance with the present invention, is concerned, the controller of the robot can perform selection based on the following alternatives, highlighted with reference to FIGS. 7 and 8.

FIG. 7 shows a flow diagram of the program that the controller of the robot can execute based on the results calculated by the device object of the invention, in the case of execution of an alternative path to the pre-programmed one.

After the START step, it updates the robot configuration q (block 70).

Then, the reception of directions, productivity indices and path recalculation request take place (block 71).

Then the controller verifies whether an alternative path is possible (block 72).

If it is not possible, it controls the reduction of the speed of the robot, possibly to the point of completely stopping the motion thereof (block 73).

On the other hand, if it is possible, it passes to the execution of the alternative path (block 74).

More in particular it calculates all of the possible initiation points using directions and productivity indices received by the device of the invention (block 75). Then it selects the best initiation point coherently with the position to be reached (block 76). Then it interrupts the execution of the current path (block 77). Then it adds the coordinates of the initiation point to the current path (block 78). Then it reactivates the execution of the updated path (block 79).

The operations of blocks 70-79 are carried out cyclically.

FIG. 8 shows a flow diagram of the program that the controller of the robot can execute based on the results calculated by the device object of the invention, in the case of execution of a new path with alternative final position, possibly not known a priori, which is different from the pre-programmed path.

After the START step, the robot configuration q is updated (block 80).

Then the reception of directions, productivity indices and path recalculation request takes place (block 81).

Then the controller verifies whether an alternative final position, possibly not known a priori, is possible (block 82).

If it is not possible, it controls the reduction of the speed of the robot, possibly to the point of completely stopping the motion thereof (block 83).

On the other hand, if it is possible, it goes to the execution of the new path with alternative final position (block 84).

More in particular, it selects the best direction of productivity coherently with all of the possible final positions able to be reached (block 85). In other words it selects the productivity index proportional to the maximum speed at which the collaborative robot can proceed in that direction without having to slow down or stop.

Then it interrupts the execution of the current task (block 86). Then it executes the new movement towards the identified position (block 87).

The operations of blocks 80-87 are carried out cyclically.

Moreover, the controller can establish that no alternative path is possible, and it thus decides to slow down the robot to the point of stopping if necessary.

In the embodiments described above reference has been made to simplified variants of presence of a collaborative robot and a human operator. However, it is clear that the method and the device object of the invention are applicable to the more general case of presence of many collaborative robots and many operators.

The case of many human operators does not actually involve any modification to the method object of the invention, in the sense that in the set p of points belonging to the operator all of the points will be included belonging to all of the operators that the device will be able to detect in the work area of the robot, since all of the operators present in the area monitored by the device, together with the prediction of the motion of each one, will be considered as obstacles for each robot.

As far as the case of presence of many collaborative robots is concerned, every robot, taking into account all of the operators presents, will apply the method in object calculating its own productivity directions/indices, such as to give each robot, in an independent manner, the possibility to modify its own path.

Summarizing, the method object of the invention makes it possible to supply the controller(s) of the robot with a series of productivity indices and relative directions.

On the controller side of the robot it makes it possible to select among the following possibilities, which also depends on the type of activity that the robot must carry out, for example what type of movement its terminal member must carry out, and/or based on a criterion of profitability of the task to be carried out:

1) change task/target of the robot, with execution of a new path with alternative final position, possibly not known a priori, which is different from a pre-programmed final position;
2) avoiding the obstacle/operator by the terminal member, with execution of an alternative direction of motion or path to a pre-programmed direction;
3) slowing down and possibly stopping.

The choice among these possibilities, as described above, can be made through a priority mechanism. Whereas alternative 3) is always possible, 1) and 2) may not be usable in certain applications or at certain moments. For example, if for a certain task of the robot there is not an alternative target, only options 2) and 3) are applicable.

As priority mechanism, it is also possible to use profitability criteria of the task: if a task for the robot has a high added value for the production context in which it is inserted, then it is better to take it to its conclusion avoiding the obstacle like in point 2). If there is the possibility of interrupting the current task to undertake a more profitable one then 1) is better. The priority mechanism can be preset in the robot.

The method object of the present invention can be advantageously carried out at least in part through a computer program that comprises encoding means for performing one or more steps of the method, when this program is executed on a computer. Therefore, the scope of protection is meant to extend to said computer program and also to computer-readable means that comprise a recorded message, said computer-readable means comprising program encoding means for performing one or more steps of the method, when said program is executed on a computer.

Said computer program, described by the flow diagram of FIG. 3, can be written with any programming language. The programs executed by the controller of the robot, exemplified by the flow diagrams of FIGS. 7 and 8, can be written with a programming language known to those skilled in the art, for example RAPID, KRL, URscript, VAL, Karel.

Variant embodiments of the non-limiting example described are possible, without moreover departing from the scope of protection of the present invention, all comprising the equivalent embodiments for those skilled in the art.

The elements and the characteristics illustrated in the different preferred embodiments can be combined with each other without moreover departing from the scope of protection of the present invention.

The advantages deriving from the application of the present invention are clear.

The optimization of performance in terms of productivity of a collaborative robot, the decrease of the cycle time also in the presence of one or more human operators, greater (cognitive) decisional capability for the robot and the increase in safety perceived by the human operator are obtained.

By means of the present invention it is possible to interpret the intentions of the human operator, and to a certain extent predict the behaviour thereof, so as to prevent the robot from stopping. For this purpose, alternative strategies for executing the operations of the robot are provided that take into account information coming, for example, from vision sensors so as to ensure, at all times, optimal levels of productivity, not only for the robot(s), but for the entire work station (operators and robot).

From the description given above those skilled in the art can achieve the object of the invention without introducing further constructive details. In particular, by applying their knowledge, they will be able to make the programs that implement the functions of the method from only reading what has been described above.

The invention claimed is:

1. A method for controlling one or more collaborative robots, each one of said one or more collaborative robots being mounted on a fixed or movable base and being equipped with:
one or more terminal members;
a motion controller configured to move, along predetermined directions, said one or more terminal members based on a position of at least a human operator;
wherein said method comprises the following iterative steps:
determining position coordinates of said human operator;
determining position coordinates of each one of said terminal members;
for each terminal member determining, as a function of both said position coordinates of said terminal member and said position coordinates of said human operator, a plurality of productivity indices;
each productivity index being associated with a respective one of said predetermined directions;
each productivity index being indicative of a maximum speed at which a respective terminal member can move, in a respective one of said predetermined directions, at least in case of a presence of said human operator;
supplying to said motion controller said productivity indices;
activating said motion controller to move, along said predetermined directions, said one or more terminal members based on said productivity indices.

2. The method according to claim 1, wherein each collaborative robot comprises at least a robotic manipulator provided with a number n of joints; each terminal member being coupled to a respective robotic manipulator;
wherein:
said determining position coordinates of each one of said terminal members comprises:
cyclically reading a linear position or angular position of each joint of a respective robotic manipulator;
collecting said linear positions or said angular positions of each joint in a position vector q having n components; and
calculating a speed vector $\dot{q}$ as a function of said position vector q;

said determining position coordinates of said human operator comprises:
- cyclically determining a number η of points detected on said human operator; and
- collecting said number η of points in an operator position vector p; said operator position vector p having 3*η components, corresponding to a three position coordinates of a respective point;

said determining a plurality of productivity indices comprises:
- calculating a matrix E(p,q) and a vector f(p,q), wherein:
    - E(p,q) is a matrix of 2*n*η×n size, calculated as a function of both said operator position vector p and said position vector q;
    - f(p,q) is a vector of 2*n*η components; calculated as a function of both said operator position vector p and said position vector q; and
- determining said productivity indices as a function of said matrix E(p,q) and said vector f(p,q), wherein the relation E(p,q)q̇≤f(p,q) holds.

3. The method according to claim 2, wherein said determining a plurality of productivity indices further comprises:
- calculating a singular value decomposition of said matrix E(p,q), obtaining matrices U, S and V; wherein:
    - said matrix U is an orthogonal square matrix of (2*n*η×2*n*η) size;
    - said matrix S is a matrix of (2*n*η, n) size containing singular values of said matrix E(p,q);
    - said matrix V is an orthogonal square matrix of (n×n) size; each column i of said matrix V corresponding to a respective movement direction $v_i$, in a joint coordinate system, of a respective terminal member;
    - for each movement direction $v_i$, calculating a respective value $\varphi_i^{max}=\max\{\varphi\}$, in the joint coordinate system, corresponding to a maximum intensity of a movement speed along a respective direction $v_i$, wherein the relations:

$$\varphi E(p,q)v_i \leq f(p,q)$$

$$|\varphi v_i| \leq \dot{q}_{max}$$

hold, $\dot{q}_{max}$ being a vector of maximum speeds that a single joint coordinate can assume;
- for each movement direction $v_i$, converting said value $\varphi_i^{max}$ from the joint coordinate system into a coordinate system based on said position coordinates of said respective terminal member;
- for each movement direction $v_i$, calculating said productivity indices as a function of said value $\varphi_i^{max}$ in said coordinate system based on said position coordinates of said respective terminal member.

4. The method according to claim 1, wherein said activating said motion controller to move said one or more terminal members based on said productivity indices further comprises one or more of the following:
- executing a direction of motion or path which is alternative to said predetermined direction;
- executing a new path with an alternative final position, possibly not known a priori, which is different than said predetermined movement final position;
- slowing down the motion of said robot;
- stopping the motion of said robot.

5. The method according to claim 4, wherein said controller for controlling the motion of one or more robots decides to take said actions on the basis of a priority mechanism that depends on the type of activity that the robot must carry out and/or the type of movement that said terminal member must make and/or a criterion of profitability of the task to be carried out.

6. A device for controlling the motion of one or more collaborative robots, wherein said device comprises means for implementing the method according to claim 1, said means comprising:
- at least one vision system adapted to cyclically determining said position coordinates of one or more human operators over time;
- means for determining said position coordinates of each one of said terminal members; and
- means for determining said set of productivity indices associated with respective directions of motion of the terminal member of the robot.

* * * * *